H. AUSTIN.
MOUNTING TRACTORS UPON THEIR STEERING AXLES AND STRENGTHENING SUCH AXLES.
APPLICATION FILED MAR. 26, 1919.
1,305,243.
Patented June 3, 1919.
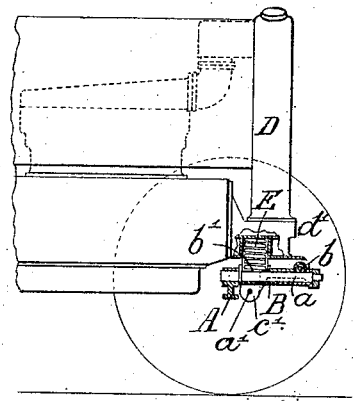
Fig. 1.
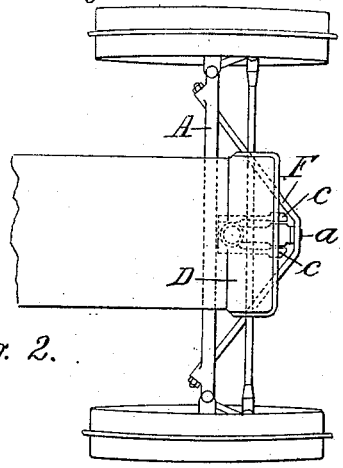
Fig. 2.
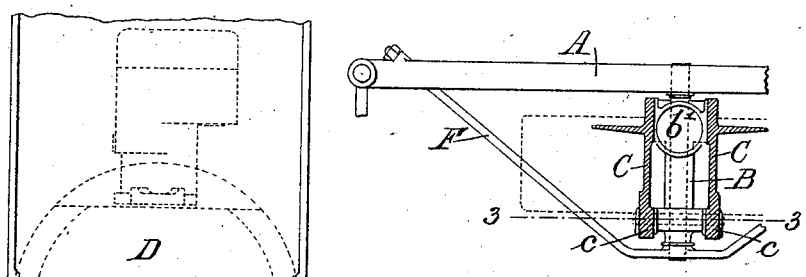
Fig. 3.
Fig. 4.
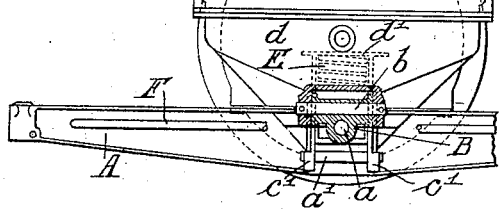
Inventor
Herbert Austin
By F. C. Somes
Attorney.

UNITED STATES PATENT OFFICE.

HERBERT AUSTIN, OF BROMSGROVE, ENGLAND.

MOUNTING TRACTORS UPON THEIR STEERING-AXLES AND STRENGTHENING SUCH AXLES.

1,305,243.  Specification of Letters Patent.  Patented June 3, 1919.

Application filed March 26, 1919. Serial No. 285,295.

*To all whom it may concern:*

Be it known that I, HERBERT AUSTIN, a subject of the King of Great Britain, and residing at Bromsgrove, in the county of Worcester, England, have invented certain new and useful Improvements in Mounting Tractors upon Their Steering-Axles and Strengthening Such Axles, of which the following is a specification.

This invention has for its objects to improve the manner of mounting a tractor upon a steering axle through the medium of a spring or springs, and to strengthen the axle against strains caused by obstructions against the wheels thereof.

The object first above described is accomplished according to this invention by connecting the axle with the tractor frame through the medium of a pin which is rigid with the axle and projects horizontally from the middle thereof and is housed within a sleeve, within which it may turn, which is pivoted transversely at its end which is remote from the axle to a support which is rigid with the tractor frame, a spring or springs by which the weight of the corresponding end of the tractor is supported from the steering axle being interposed between the upper side of the inner end of the sleeve and an abutment which is rigid with the tractor frame. The sleeve is guided vertically by cheeks which are rigid with the frame.

The object secondly above described is accomplished by rods, or perch bars, which connect the ends of the axle with the outer end of a projection from the middle of the axle which, when the axle is connected with the frame as described, is conveniently the pin aforesaid.

The invention is more particularly described with reference to the drawings herewith, of which:—

Figure 1 is an elevation of the forward end of a tractor to which the invention is applied, the steering axle and means by which it is connected with the tractor being shown in section.

Fig. 2 is a plan view of the portion of the tractor and of the steering axle shown by Fig. 1.

Fig. 3 is a front view, to an enlarged scale, with the front wheels and their connections with the axle omitted, one end of the front axle and the upper portion of the radiator broken away, and the connection between the axle and frame shown as a section taken on line 3 3 of Fig. 4; and, Fig. 4 is a detached plan view, partly in section, also to an enlarged scale, of the means of connecting the front axle with the tractor frame, strengthening the axle against strains caused by obstructions against the front wheels, and spring-supporting the tractor from the axle.

The steering axle A has rigid therewith a forwardly projecting horizontal pin $a$ which is housed within a sleeve B within which it may turn about the common axis of the pin and sleeve, and the sleeve B is pivoted at its forward end, by means of a transverse pin $b$, between jaws $c$ at the forward ends of cheeks C which are rigid with the base $d$ of the radiator D. The sleeve B is formed at the upper side of its rear end with a shallow well or pocket $b'$ and in the bottom of the middle of the base $d$ of the radiator is formed a pocket $d'$, and a spiral spring E, which abuts against the bottom of the well $b'$ and against the crown of the pocket $d'$, transmits the weight of the forward part of the tractor to the sleeve. Tie-rods or perch bars F, forming preferably a single bent rod or bar, are connected at their outer ends with the axle A near to the ends thereof, respectively, and the forward end of the pin $a$ passes through the point of their junction. These tie-rods consequently greatly strengthen the axle against yielding under strains caused by obstructions against the front wheels. The rear ends of the cheeks are formed as downward lugs $c'$ through which a pin $a'$ passes beneath the rear end of the sleeve B and prevents the axle A falling unduly when the tractor is lifted. The rear end of the sleeve B is an easy fit between the rear ends of the cheeks C and is guided thereby as it rises and falls in relation to the tractor frame.

The tractor may, of course, be constructed to run with the steering axle at the rear.

Having fully described my invention, what I claim and desire to secure by Letters Patent, is:—

1. The combination, in a tractor, of a steering axle, a pin which projects from the middle of the axle, a sleeve within which the pin is housed and within which it is capable of turning about its axis, said sleeve being pivotally connected at its end which is remote from the axle with the tractor frame, and a spring interposed between the tractor frame and the free end of the sleeve, substantially as set forth.

2. The combination, in a tractor, of a steering axle, a pin which projects from the middle of the axle, a sleeve within which the pin is housed and within which it is capable of turning about its axis, said sleeve being pivotally connected at its end which is remote from the axle with the tractor frame, an inverted pocket which is rigid with the tractor frame, and a spring which beds upon the free end of the sleeve and against the crown of the pocket, substantially as set forth.

3. The combination, in a tractor, of a steering axle, a pin which projects from the middle of the axle, a sleeve within which the pin is housed and within which it is capable of turning about its axis, said sleeve being pivotally connected at the end which is remote from the axle with the tractor frame, a spring interposed between the tractor frame and the free end of the sleeve, and diagonal rods which connect between points of the axle which are in the neighborhood of the ends thereof and the outer end of said pin, substantially as set forth.

In witness whereof I have hereunto signed my name this 14th day of February, 1919, in the presence of two subscribing witnesses.

HERBERT AUSTIN.

Witnesses:
WILLIAM ARTHUR HOWITT,
JULIA GERTRUDE BOTT.

Copies of this patent may be obtained for five cents each, by addressing the "Commissioner of Patents, Washington, D. C."